United States Patent
Li et al.

(10) Patent No.: US 12,307,746 B1
(45) Date of Patent: May 20, 2025

(54) NIGHTTIME UNMANNED AERIAL VEHICLE OBJECT TRACKING METHOD FUSING HYBRID ATTENTION MECHANISM

(71) Applicant: Chongqing University of Technology, Chongqing (CN)

(72) Inventors: Yanmei Li, Chongqing (CN); Tao Yu, Chongqing (CN); Hanguang Xiao, Chongqing (CN); Ningsheng Liao, Chongqing (CN); Xiaoshuang Li, Chongqing (CN); Qibin Yang, Chongqing (CN); Jingshi Deng, Chongqing (CN)

(73) Assignee: Chongqing University of Technology, Chongqing (CN)

( * ) Notice: Subject to any disclaimer, the term of this patent is extended or adjusted under 35 U.S.C. 154(b) by 0 days.

(21) Appl. No.: 19/035,653

(22) Filed: Jan. 23, 2025

(30) Foreign Application Priority Data

Jan. 24, 2024   (CN) .......................... 202410099370.9

(51) Int. Cl.
*G06V 10/77* (2022.01)
*G06V 10/20* (2022.01)
(Continued)

(52) U.S. Cl.
CPC ........ *G06V 10/7715* (2022.01); *G06V 10/255* (2022.01); *G06V 10/30* (2022.01);
(Continued)

(58) Field of Classification Search
CPC .. G06V 10/7715; G06V 10/255; G06V 10/30; G06V 10/776; G06V 10/82; G06V 20/17; G06V 20/40
See application file for complete search history.

(56) References Cited

U.S. PATENT DOCUMENTS 11,810,366 B1   11/2023   Wang et al.

FOREIGN PATENT DOCUMENTS

| CN | 115456884 A | 12/2022 |
|---|---|---|
| CN | 116543021 A | 8/2023 |

(Continued)

OTHER PUBLICATIONS

Ye et al, Tracker Meets Night: A Transformer Enhancer for UAV Tracking, 2022, IEEE Robotics and Automation Letters, 2(7): 3866-3873. (Year: 2022).*

(Continued)

*Primary Examiner* — Kathleen M Broughton (57) ABSTRACT

Disclosed is a nighttime unmanned aerial vehicle (UAV) object tracking method fusing a hybrid attention mechanism. According to the method, a night vision image enhancement model is employed to enhance various nighttime image frames in a night vision video sequence of UAV before performing image object tracking and recognition, to improve the accuracy of object tracking for nighttime images. With the aid of a spatial channel hybrid attention mechanism, the night vision image enhancement model can adaptively learn spatial channel features, enhancing generalization ability, and enabling the network model to focus on more effective features. Additionally, a denoising processing module is introduced to remove noise hidden in the nighttime images, improving the object positioning accuracy and tracking performance of UAV in nighttime scenarios, and reducing the failure probability of object tracking by UAV in nighttime scenarios.

9 Claims, 6 Drawing Sheets

(51) Int. Cl.
    *G06V 10/30*     (2022.01)
    *G06V 10/776*     (2022.01)
    *G06V 10/82*     (2022.01)
    *G06V 20/17*     (2022.01)
    *G06V 20/40*     (2022.01)

(52) U.S. Cl.
    CPC ............ *G06V 10/776* (2022.01); *G06V 10/82* (2022.01); *G06V 20/17* (2022.01); *G06V 20/40* (2022.01)

(56) References Cited

FOREIGN PATENT DOCUMENTS

| | | | |
|---|---|---|---|
| CN | 117011194 A | 11/2023 | |
| CN | 117115616 A | 11/2023 | |

OTHER PUBLICATIONS

Xi et al, Detection-Driven Exposure-Correction Network for Nighttime Drone-View Object Detection, 2024, IEEE Transactions on Geoscience and Remote Sensing, 62 (2024): 1-14. (Year: 2024).*

He et al, REUT: A Retinex-inspired Low-light Image Enhancer for UAV Tracking at Night, 2022, IEEE Smartworld, Ubiquitous Intelligence & Computing, Scalable Computing & Communications, Digital Twin, Privacy Computing, Metaverse, Autonomous & Trusted Vehicles, pp. 1-7. (Year: 2022).*

* cited by examiner

NIGHTTIME UNMANNED AERIAL VEHICLE OBJECT TRACKING METHOD FUSING HYBRID ATTENTION MECHANISM

CROSS-REFERENCE TO RELATED APPLICATION

This application claims priority of Chinese Patent Application No. 202410099370.9, filed on Jan. 24, 2024, the entire contents of which are incorporated herein by reference.

TECHNICAL FIELD

The disclosure relates to the technical field of computer vision object tracking, and in particular to a nighttime unmanned aerial vehicle (UAV) object tracking method fusing a hybrid attention mechanism.

BACKGROUND

In recent years, with small size, flexible action, simple operation and other advantages, UAV is increasingly applied in many fields including civil, military, and science. For instance, UAV has important research significance in disaster rescue and relief under extreme weather, enemy information collection in battlefield, intelligent monitoring in agriculture, and object recognition and tracking from a UAV perspective. UAV nighttime object tracking is classified into a branch of general object tracking, with its task involving that, an object, after being designated in the first frame of a video sequence, is continuously tracked in subsequent frames. A bounding box (typically represented by a rectangular box) is utilized to target the object, achieving positioning and scale estimation of the object.

Object tracking methods are mainly classified into two categories: one category is based on correlation filtering method and another category is based on deep learning method.

Correlation filtering method was first applied in the field of computer vision in the 1980s, which was introduced into the field of object tracking by Bolme et al. in 2010 for the first time, utilizing the Fast Fourier Transform (FFT) and the convolution theorem to propose the Minimum Output Sum of Squared Error (MOSSE) algorithm, which determines the position of the object by calculating the maximum response value in the candidate regions. However, relying on manual design, this method is greatly limited when dealing with object whose appearance deforms.

With the rapid advancement of deep learning, deep neural networks have been widely applied in the field of computer vision for learning image features from large-scale data. Siamese networks have become a hotspot in object tracking due to their advantages of fewer parameters and faster computation. In Siamese fully convolutional network (SiamFC), Siamese networks are firstly introduced into the field of object tracking. Inspired by Faster region-based convolutional neural networks (Faster RCNN), Siam region proposal network (SiamRPN) is obtained by incorporating RPN into the Siamese network framework, improving the robustness of tracker. Deep residual networks (ResNet) is introduced into SiamRPN++, significantly enhancing tracking performance. To avoid the complex subsequent calculations involved in anchor box design, some researchers have introduced the anchor-free concept, and anchor-free methods are proposed in HiFT and SiamAPN++ to distinguish between objects and backgrounds. However, most of these algorithms are designed for daytime tracking scenarios, and the different distribution of nighttime image features significantly impairs the nighttime UAV tracking performance.

SUMMARY

In response to the above deficiencies existing in prior art, an objective of the disclosure is to provide a nighttime UAV object tracking method fusing a hybrid attention mechanism, aiming to improve the positioning accuracy of nighttime UAV object tracking and reduce the failure probability of object tracking by UAV in nighttime scenarios.

To solve the above technical problems, the disclosure adopts the following technical solutions.

A nighttime UAV object tracking method fusing a hybrid attention mechanism includes: acquiring a night vision video sequence from a UAV, inputting a nighttime image frame of the night vision video sequence into a pre-trained night vision image enhancement model, to obtain a corresponding enhanced nighttime image frame, and performing image object tracking and recognition on the enhanced nighttime image frame, to obtain an object tracking and recognition result;

the night vision image enhancement model including an encoder module, a spatial hybrid attention module, a channel hybrid attention module, a decoder module, a curve projection module, and a denoising processing module;

the encoder module being configured to extract an initial convolutional feature map of the nighttime image frame;

the spatial hybrid attention module being configured to enhance the attention of a feature space dimension of the initial convolutional feature map, to form a spatial attention feature map of the nighttime image frame;

the channel hybrid attention module being configured to enhance the attention of a feature channel dimension of the spatial attention feature map, to form a hybrid attention feature map of the nighttime image frame;

the decoder module being configured to convert the hybrid attention feature map into a curve estimation parameter map;

the curve projection module being configured to map the curve estimation parameter map onto the nighttime image frame in a curve projection manner, to form an intermediate feature image of the nighttime image frame; and the denoising processing module being configured to perform denoising processing on the intermediate feature image, to obtain the corresponding enhanced nighttime image frame.

In a preferred solution, the encoder module includes four convolutional layers and four downsampling layers connected in series, for performing convolutional processing and pooling processing on the inputted nighttime image frame in sequence, to obtain the initial convolutional feature map of the nighttime image frame after convolutional processing;

a processing procedure for extracting the initial convolutional feature map of the nighttime image frame by the encoder module being expressed as:

$F_{en1} = \text{Pool}(\text{Conv}(X)_{en1})_{en1};$ $F_{en2} = \text{Pool}(\text{Conv}(F_{en1})_{en2})_{en2};$ $F_{en3} = \text{Pool}(\text{Conv}(F_{en2})_{en3})_{en3};$ $$F_{en}=\text{Pool}(\text{Conv}(F_{en3})_{en4})_{en4};$$

where X represents an inputted original nighttime image frame, $\text{Conv}(\bullet)_{eni}$ represents an operator of an ith convolutional layer in the encoder module, $\text{Pool}(\bullet)_{eni}$ represents an operator of an ith downsampling layer in the encoder module, i=1,2,3,4, $F_{en1}$, $F_{en2}$, and $F_{en3}$ represent intermediate operational outputs in the encoder module, and $F_{en}$ represents an initial convolutional feature map outputted by the encoder module.

In a preferred solution, the spatial hybrid attention module includes a first normalization layer (LayerNorm1), a spatial attention module unit (SAM), a first window multi-head self-attention unit (W-MSA1), a second normalization layer (LayerNorm2), and a first residual feedforward network layer (ResFFN1); an input feature map of the spatial hybrid attention module is transmitted to the LayerNorm1, and an output of the LayerNorm1 is connected to an input of the SAM and an input of the W-MSA1, respectively; an output of the SAM and an output of the W-MSA1 are added to an input feature of the spatial hybrid attention module, to form an intermediate feature map; and then an intermediate feature, after being sequentially processed by the LayerNorm2 and the ResFFN1, is added to the intermediate feature map, to obtain the spatial attention feature map, which serves as an output of the spatial hybrid attention module;

a processing procedure for extracting the spatial attention feature map of the nighttime image frame by the spatial hybrid attention module being expressed as:

$$F_N = \text{LN}_1(F_{en});$$

$$F_M = \lambda_1 \text{SAM}(F_N) + \text{W-MSA}_1(F_N) + F_{en};$$

$$F_{SHA} = \text{ResFFN}_1(\text{LN}_2(F_M)) + F_M;$$

where $F_{en}$ represents an initial convolutional feature map inputted into the spatial hybrid attention module, $\text{LN}_1(\bullet)$ represents an operator of the LayerNorm1, $F_N$ represents an output of the LayerNorm1; $\text{SAM}(\bullet)$ and $\text{W-MSA}_1(\bullet)$ represent an operator of the SAM and an operator of the W-MSA1, respectively, $\lambda_1$ represents a spatial attention weight, $F_M$ represents an intermediate feature map obtained by adding an output of the operator of the SAM and an output of the W-MSA1 to an input feature map; $\text{LN}_2(\bullet)$ and $\text{ResFFN}_1(\bullet)$ represent an operator of the LayerNorm2 and an operator of the ResFFN1, respectively, and $F_{SHA}$ represents a spatial attention feature map outputted by the spatial hybrid attention module.

In a preferred solution, the SAM is configured to perform a convolution operation of channel compression and a Gaussian error linear unit (GELU) activation function operation on an input feature map $F_N$, followed by a convolution operation of channel restoration, and then the input feature map $F_N$ after those operations is inputted into a spatial attention layer; and in the spatial attention layer, the input feature map $F_N$ is subjected to max pooling and average pooling operations, respectively, followed by a Concat operation to aggregate vectors, and finally a two-dimensional (2D) convolution operation and a sigmoid activation function operation are performed to obtain a result, which is then multiplied by the input feature map $F_N$, to obtain an output result; a processing procedure of the SAM being expressed as:

$$F_O = \text{Conv}_U(\text{GELU}[\text{Conv}_D(F_N)]);$$

$$\text{SAM}(F_N) = \text{sigmoid}(\text{Conv}([\text{AvgPool}(F_O); \text{MaxPool}(F_O)])) \times F_O;$$

where $F_N$ and $\text{SAM}(F_N)$ represent an input and an output of the SAM, respectively, $\text{GELU}(\bullet)$ represents a GELU activation function operation, $\text{Conv}_D(\bullet)$ and $\text{Conv}_U(\bullet)$ represent a convolution operation of channel compression and a convolution operation of channel restoration, respectively, $F_O$ represents a feature map inputted into the spatial attention layer after the convolution operation of channel restoration; and $\text{AvgPool}(\bullet)$ and $\text{MaxPool}(\bullet)$ represent an average pooling operation and a max pooling operation, respectively, and $\text{Conv}(\bullet)$ represents a 2D convolution operation.

In a preferred solution, the channel hybrid attention module includes a third normalization layer (LayerNorm3), a channel attention block unit (CAB), a second window multi-head self-attention unit (W-MSA2), a fourth normalization layer (LayerNorm4), and a second residual feedforward network layer (ResFFN2); an input feature map of a hybrid attention block (HAB) is transmitted to the LayerNorm3, and an output of the LayerNorm3 is connected to an input of the CAB and an input of the W-MSA2, respectively; an output of the CAB and an output of the W-MSA2 are added to the input feature map of the HAB, to form an intermediate feature map; and an intermediate feature, after being sequentially processed by the LayerNorm4 and the ResFFN2, is added to the intermediate feature map, to obtain a channel attention feature map, which serves as an output of the channel hybrid attention module;

a processing procedure for extracting the hybrid attention feature map of the nighttime image frame by the channel hybrid attention module being expressed as:

$$F_P = \text{LN}_3(F_{SHA});$$

$$F_Q = \lambda_2 \text{CAB}(F_P) + \text{W-MSA}_2(F_P) + F_{SHA};$$

$$F_{CHA} = \text{ResFFN}_2(\text{LN}_4(F_Q)) + F_Q;$$

where $F_{SHA}$ represents a spatial attention feature map inputted into the channel hybrid attention module, $\text{LN}_3(\bullet)$ represents an operator of the LayerNorm3, and $F_P$ represents an output of the LayerNorm3; $\text{CAB}(\bullet)$ and $\text{W-MSA}_2(\bullet)$ represent an operator of the CAB and an operator of the W-MSA2, respectively, $\lambda_2$ represents a channel attention weight, $F_Q$ represents an intermediate feature map obtained by adding an output of the operator of the CAB and an output of the W-MSA2 to the input feature map; $\text{LN}_4(\bullet)$ and $\text{ResFFN}_2(\bullet)$ represent an operator of the LayerNorm4 and an operator of the ResFFN2, respectively, and $F_{CHA}$ represents a hybrid attention feature map outputted by the channel hybrid attention module.

In a preferred solution, the CAB is configured to perform a convolution operation of channel compression and a GELU activation function operation on the input feature map, followed by a convolution operation of channel restoration, and then the input feature map after those operations is inputted into the channel attention layer; and in the channel attention layer, the input feature map is subjected to adaptive average pooling, followed by channel compression processing and ReLU activation function operation, and then channel restoration processing and sigmoid function operation are performed to obtain a result, which is then multiplied by the feature map inputted into the channel attention layer, to obtain an output result; a processing procedure of the CAB being expressed as:

$$F_B = \text{Conv}_U(\text{GELU}[\text{Conv}_D(F_P)]);$$

$$CAB(F_P)=H_{GP}(F_B) \cdot \text{sigmoid}[W_U(\delta(W_D(F_B)))] \times F_B;$$

where $F_P$ and $CAB(F_P)$ represent an input and an output of the CAB, respectively, GELU(•) represents a GELU activation function operation, $\text{Conv}_D(\bullet)$ and $\text{Conv}_U(\bullet)$ represent a convolution operation of channel compression and a convolution operation of channel restoration, respectively, and $F_B$ represents a feature map inputted to the channel attention layer after the convolution operation of channel restoration; $H_{GP}(\bullet)$ represents adaptive average pooling, sigmoid(•) and $\delta(\bullet)$ represent a sigmoid activation function and a rectified linear unit (ReLU) activation function operation, respectively, and $W_D(\bullet)$ and $W_U(\bullet)$ represent channel compression processing and channel restoration processing, respectively.

In a preferred solution, the decoder module includes four convolutional layers and four upsampling layers connected in series, for performing convolutional processing and upsampling deconvolution processing on the inputted hybrid attention feature map in sequence, followed by hyperbolic tangent conversion processing, to obtain the curve estimation parameter map; a processing procedure of the decoder module being expressed as:

$$F_{de1}=\text{Up}(\text{Conv}(F_{CHA})_{de1})_{de1};$$

$$F_{de2}=\text{Up}(\text{Conv}(F_{de1})_{de2})_{de2};$$

$$F_{de3}=\text{Up}(\text{Conv}(F_{de2})_{de3})_{de3};$$

$$F_{de4}=\text{Up}(\text{Conv}(F_{de3})_{de4})_{de4};$$

$$F_{de}=\tanh(\text{Conv}(F_{de4})_{de});$$

where $F_{CHA}$ represents a hybrid attention feature map inputted into the decoder module, $\text{Conv}(\bullet)_{dei}$ represents an operator of an ith convolutional layer in the decoder module, $\text{Up}(\bullet)_{dei}$ represents an operator of an ith upsampling deconvolution layer in the decoder module, i=1,2,3,4, $F_{de1}$, $F_{de2}$, $F_{de3}$, and $F_{de4}$ represent intermediate operational outputs in the decoder module, $\text{Conv}(\bullet)_{de}$ represents a convolutional operator during conversion processing in the decoder module, tanh(•) represents a hyperbolic tangent function tanh operation, and $F_{de}$ represents a curve estimation parameter map outputted by the encoder module.

In a preferred solution, the curve projection module is configured to perform pixel-by-pixel multiplication using the curve estimation parameter map and the original nighttime image frame, and a result is mapped to the nighttime image frame through curve projection, forming the intermediate feature image;

a processing procedure of the curve projection module being expressed as:

$$X'=X+F_{de}\odot(1-X);$$

where $F_{de}$ represents a curve estimation parameter map outputted by the decoder module, X represents a nighttime image frame, $\odot$ represents a curve projection operator of element-by-element multiplication, and X' represents an output intermediate feature image.

In a preferred solution, the denoising processing module includes 19 convolutional activation units connected in series and a hyperbolic tangent branch unit, with each convolutional activation unit including a 2D convolutional layer and a ReLU activation function layer; a processing procedure of the denoising processing module being expressed as:

$$X_{out}=X'+\tanh(W(X')_{19});$$

where X' represents an intermediate feature image inputted into the denoising processing module, $X_{out}$ represents an enhanced nighttime image frame after denoising processing by the denoising processing module, $W(\bullet)_{19}$ represents 19 sets of 2D convolution operations and ReLU activation function operations connected in series, and tanh(•) represents a hyperbolic tangent function tanh operation.

In a preferred solution, the night vision image enhancement model can be trained as follows:

taking pre-completed night vision and daytime images as paired training samples, to constitute a training sample set, which serves as an input of the night vision image enhancement model, calculating a training loss according to the enhanced night vision image obtained and the corresponding daytime image of the training sample, and optimizing parameters of the night vision image enhancement model according to the training loss until the night vision image enhancement model converges, obtaining a trained night vision image enhancement model;

during the training of the night vision image enhancement model, the training loss is calculated using the following formula:

$$\text{loss}=\sum_{j=3}^{5}\frac{\|\phi_j(X_{out})-\phi_j(Y)\|_2}{c_j w_j h_j}$$

where $\phi_i(\bullet)$ represents an operation of extracting features from an $i_{th}$ layer of an AlexNet network, $X_{out}$ represents an enhanced nighttime image frame obtained after the nighttime image frame in the paired training sample is enhanced by the night vision image enhancement model, Y represents a daytime image frame in the paired training sample, $c_j$ represents the number of channels of a feature map extracted from a $j_{th}$ layer of the AlexNet network, $w_j$ represents a width of the feature map extracted from the $j_{th}$ layer of the AlexNet network, $h_j$ represents a height of the feature map extracted from the $j_{th}$ layer of the AlexNet network, and $\|\bullet\|_2$ represents an L2 norm operation.

Compared with the prior art, the disclosure has the following beneficial effects:

1. According to the nighttime UAV object tracking method fusing a hybrid attention mechanism proposed by the disclosure, the night vision image enhancement model is utilized to enhance various night image frames in the night vision video sequence of UAV before performing image object tracking and recognition, to improve the accuracy of object tracking for nighttime images. Specifically, the enhancement processing on night image frames in the night vision video sequence by the night vision image enhancement model is regarded as a curve projection task, and the red, green, and blue channel values are adjusted to improve image quality. With the aid of the spatial channel hybrid attention mechanism, the model can adaptively learn spatial channel features, enhancing generalization ability, and allowing the network model to focus on more effective features. Additionally, the denoising processing module is introduced to remove noise hidden in nighttime images, thereby improving the object positioning accuracy and tracking performance of UAV in nighttime scenarios, and reducing the failure probability of object tracking by UAV in nighttime scenarios.

2. According to the nighttime UAV object tracking method fusing a hybrid attention mechanism proposed by the disclosure, after enhancing night image frames of the night vision video sequence using the night vision image enhancement model, various object tracking algorithms can be broadly combined and applied to execute nighttime UAV object tracking tasks, significantly enhancing UAV tracking performance in nighttime scenarios, and showing great value for technical application and promotion.

DETAILED DESCRIPTION

For clearer objective, technical solutions and advantages of the disclosure, the technical solutions of the examples in the present resourceful will be described clearly and completely by reference to the accompanying drawings of the examples in the disclosure below. Obviously, the examples described are only some, rather than all examples of the disclosure. The components of examples of the disclosure generally described and illustrated in the accompanying drawings herein may be arranged and designed in a variety of different configurations. Therefore, the detailed description of the examples of the disclosure provided in the accompanying drawings is not intended to limit the scope claimed by the disclosure, but merely to represent selected examples of the disclosure. On the basis of the examples of the present resourceful, all other examples obtained by those ordinary skilled in the art without creative efforts fall within the scope of protection of the disclosure.

The specific embodiment of the disclosure is described further with reference to the specific examples.

In response to the issue of poor positioning accuracy and performance of UAV executing object tracking tasks in nighttime scenarios in prior art, the disclosure provides a nighttime UAV object tracking method fusing a hybrid attention mechanism. The overall flow of this method is shown in FIG. 1, including: acquiring a night vision video sequence from a UAV, inputting a nighttime image frame of the night vision video sequence into a pre-trained night vision image enhancement model, to obtain a corresponding enhanced nighttime image frame, and performing image object tracking and recognition on the enhanced nighttime image frame, to obtain an object tracking and recognition result.

Figure 2:
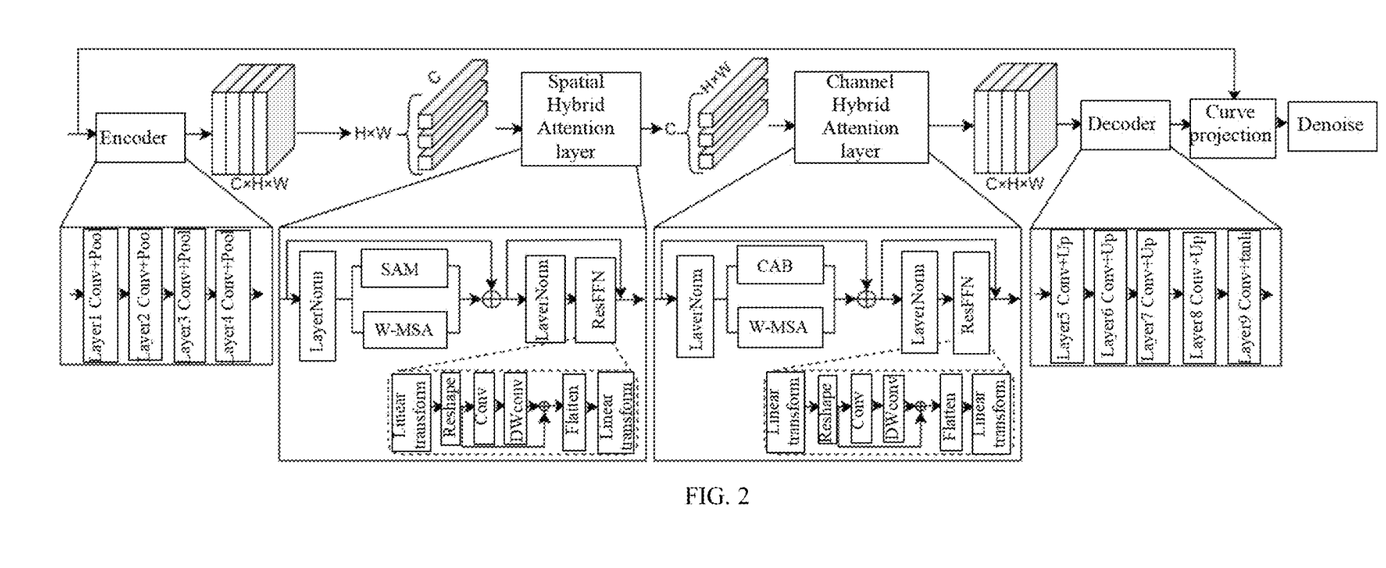
FIG. 2 is a schematic diagram of the architecture of SCHAB-Net, which is a night vision image enhancement model in the method of the disclosure.

The night vision image enhancement model of the disclosure employs a deep learning network model that integrates a hybrid attention mechanism, and can be abbreviated as SCHAB-Net, with the processing flow shown in FIG. 2. The night vision image enhancement model includes an encoder module, a spatial hybrid attention module, a channel hybrid attention module, a decoder module, a curve projection module, and a denoising processing module. The encoder module is configured to extract an initial convolutional feature map from a nighttime image frame. The spatial hybrid attention module is configured to enhance the attention of a feature spatial dimension of the initial convolutional feature map, forming a spatial attention feature map of the nighttime image frame. The channel hybrid attention module is configured to enhance the attention of a feature channel dimension of the spatial attention feature map, forming a hybrid attention feature map of the nighttime image frame. The decoder module is configured to convert the hybrid attention feature map into a curve estimation parameter map. The curve projection module is configured to map the curve estimation parameter map onto the nighttime image frame in a curve projection manner, forming an intermediate feature image of the nighttime image frame. The denoising processing module is configured to perform denoising on the intermediate feature image, to obtain a corresponding enhanced nighttime image frame.

Figure 1:
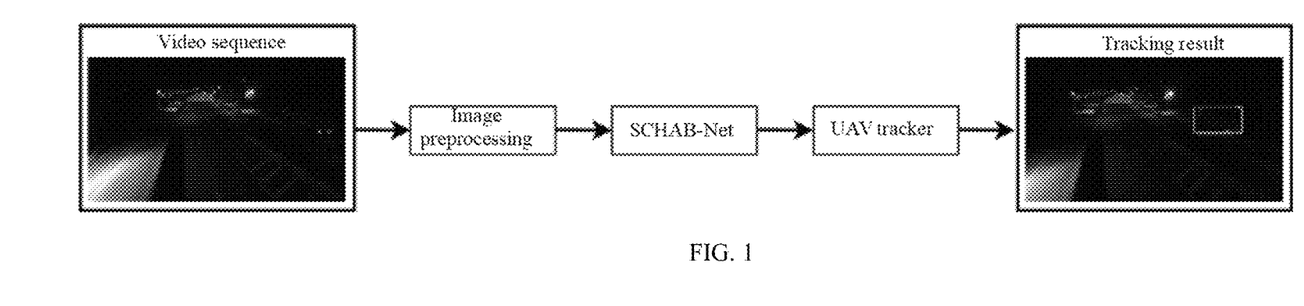
FIG. 1 is an overall flow chart of a nighttime UAV object tracking method fusing a hybrid attention mechanism according to the disclosure.

Through FIG. 1, FIG. 2, and the above flow, it can be seen that the entire real-time nighttime UAV tracking flow (as shown in FIG. 1) of the method of the disclosure is mainly divided into two stages: the SCHAB-Net nighttime image enhancement processing stage and the UAV tracker executing the object tracking and recognition task stage. To ensure more stable performance throughout the tracking process, before executing the first enhancement processing stage, certain preprocessing operations can be performed on the extracted nighttime image frame from the UAV night vision video sequence. For example, the nighttime image frame can be cropped to remove some useless information, normalized to adjust the image size, and scaled to a fixed size through scaling transformations. After these preprocessing operations, it is facilitated to subsequently send the nighttime image frame into the SCHAB-Net network model for nighttime image enhancement processing, ultimately completing the object tracking and recognition task by combining with the UAV tracker. In the nighttime UAV object tracking method fusing a hybrid attention mechanism of the disclosure, the night vision image enhancement model is utilized to enhance various nighttime image frames in the UAV night vision video sequence before performing image object tracking and recognition, thereby improving the accuracy of object tracking for nighttime images.

The night vision image enhancement model in the solution of the disclosure is described in detail below.

Night Vision Image Enhancement Model SCHAB-Net

The night vision image enhancement model SCHAB-Net adopted in the disclosure is a deep learning network model fusing a hybrid attention mechanism, which is primarily configured to enhance nighttime image frames from UAV night vision video sequences, thereby helping to improve the object tracking performance of UAV in nighttime scenarios, and improving the image quality of the input nighttime image after undergoing processing through the deep learning network. The network structure of the night vision image enhancement model SCHAB-Net is shown in FIG. 2, and it includes an encoder module, a spatial hybrid attention module, a channel hybrid attention module, a decoder module, a curve projection module, and a denoising processing module. The spatial hybrid attention module and the channel hybrid attention module are introduced to extract spatial attention feature and channel attention feature information from the nighttime image frames. Additionally, the denoising processing module is configured to remove noise hidden in the nighttime images, achieving feature enhancement processing for the nighttime image frames.

Encoder Module

The encoder module includes four convolutional layers and four downsampling layers connected in series, for performing convolutional processing and pooling processing on the inputted nighttime image frame in sequence, to obtain the initial convolutional feature map of the nighttime image frame after convolutional processing. In specific implementations, four 2D convolutional units and four pooling layers can be selected as the four convolutional layers and four downsampling layers in the encoder module, labeled as Encoder layers 1 to 4 in FIG. 2, for initial feature extraction from nighttime image frames.

A processing procedure for extracting the initial convolutional feature map of the nighttime image frame by the encoder module is expressed as:

$$F_{en1}=Pool(Conv(X)_{en1})_{en1};$$

$$F_{en2}=Pool(Conv(F_{en1})_{en2})_{en2};$$

$$F_{en3}=Pool(Conv(F_{en2})_{en3})_{en3};$$

$$F_{en}=Pool(Conv(F_{en3})_{en4})_{en4};$$

where X represents an inputted original nighttime image frame, $Conv(\bullet)_{eni}$ represents an operator of an ith convolutional layer in the encoder module, $Pool(\bullet)_{ei}$ represents an operator of an ith downsampling layer in the encoder module, i=1,2,3,4, $F_{en1}$, $F_{en2}$, and $F_{en3}$ represent intermediate operational outputs in the encoder module, and $F_{en}$ represents an initial convolutional feature map outputted by the encoder module.

Spatial Hybrid Attention Module

The spatial hybrid attention module is labeled as a spatial hybrid attention layer in FIG. 2, with a module structure including a LayerNorm1, an SAM, an W-MSA$_1$, a LayerNorm2, and a ResFFN1. An input feature map of the spatial hybrid attention module is transmitted to the LayerNorm1, and an output of the LayerNorm1 is connected to an input of the SAM and an input of the W-MSA$_1$, respectively. An output of the SAM and an output of the W-MSA$_1$ are added to an input feature of the spatial hybrid attention module, to form an intermediate feature map. An intermediate feature, after being sequentially processed by the LayerNorm2 and the ResFFN1, is added to the intermediate feature map, to obtain the spatial attention feature map, which serves as an output of the spatial hybrid attention module.

A processing procedure for extracting the spatial attention feature map of the nighttime image frame by the spatial hybrid attention layer is expressed as:

$$F_N=LN_1(F_{en});$$

$$F_M=\lambda_1 SAM(F_N)+W\text{-}MSA_1(F_N)+F_{en};$$

$$F_{SHA}=ResFFN_1(LN_2(F_M))+F_M;$$

where $F_{en}$ represents an initial convolutional feature map inputted into the spatial hybrid attention module, $LN_1(\bullet)$ represents an operator of the LayerNorm1 and $F_N$ represents an output of the LayerNorm1; $SAM(\bullet)$ and $W\text{-}MSA_1(\bullet)$ represent an operator of the SAM and an operator of the W-MSA1, respectively, $\lambda_1$ represents a spatial attention weight, and $\lambda_1=0.01$ can be taken in actual applications; $F_M$ represents an intermediate feature map obtained by adding an output of the operator of the SAM and an output of the W-MSA$_1$ to an input feature map; $LN_2(\bullet)$ and $ResFFN_1(\bullet)$ represent an operator of the LayerNorm2 and an operator of the ResFFN1, respectively, and $F_{SHA}$ represents a spatial attention feature map outputted by the spatial hybrid attention module.

The ResFFN1 is a residual feedforward network, which is a network unit commonly used in deep learning networks, with a brief introduction provided herein. As shown in FIG. 2, the processing flow of the ResFFN involves that the input feature map undergoes a first linear transformation and has its image reshaped, followed by residual operations involving a convolutional layer and a depthwise convolutional layer (DWConv), and subsequently, the feature is flattened and undergoes a second linear transformation to generate the output. Specifically, the ResFFN is a network commonly applied in prior art, and will not be described further herein.

SAM

Figure 3:
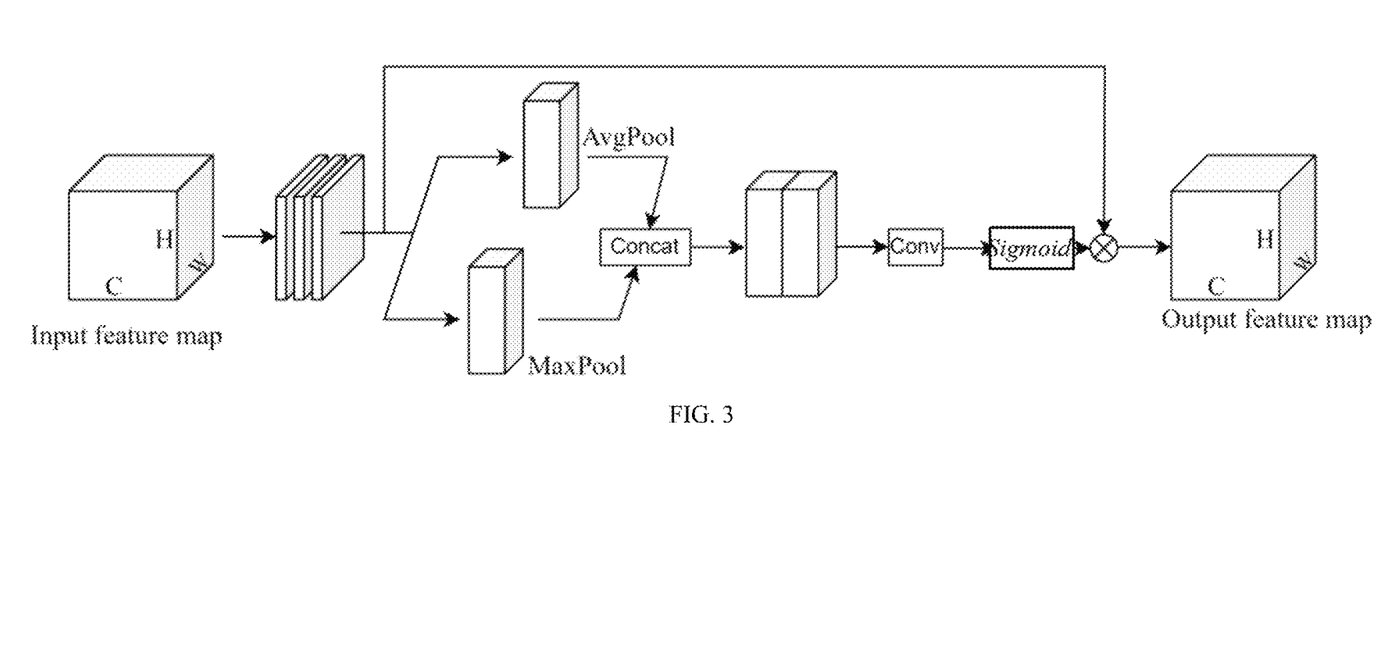
FIG. 3 is a processing flow diagram of SAM in the night vision image enhancement model.

In the spatial attention hybrid module, the SAM includes a set of Conv-GELU-Conv layers and a spatial attention layer, as shown in FIG. 3. The Conv-GELU-Conv layers are configured to perform a convolution operation of channel compression and a GELU activation function before performing a convolution operation of channel restoration, and the feature map after those operations is inputted into the spatial attention layer. For example, for an input feature with C channels, the number of channels of the output feature after the first convolutional layer is compressed to C/μ, and then is adjusted to C by the second convolutional layer, and the input feature after those operations is sent to the spatial attention layer. In the spatial attention layer, the input feature map is subjected to two parallel operations: max pooling (MaxPool) and average pooling (AvgPool), followed by a Concat operation to aggregate vectors, and finally, a 2D convolution operation and a sigmoid activation function operation are applied, and the result is multiplied by the feature map inputted into the spatial attention layer, to obtain the output result.

A processing procedure of SAM is expressed as:

$$F_O=Conv_U(GELU[Conv_D(F_N)]);$$

$$SAM(F_N)=sigmoid(Conv([AvgPool(F_O);MaxPool(F_O)]))\times F_O;$$

where $F_N$ and $SAM(F_N)$ represent an input and an output of the SAM, respectively, $GELU(\bullet)$ represents a GELU activation function operation, $Conv_D(\bullet)$ and $Conv_U(\bullet)$ represent a convolution operation of channel compression and a convolution operation of channel restoration, respectively, $F_O$ represents a feature map inputted into the spatial attention layer after the convolution operation of channel restoration; and $AvgPool(\bullet)$ and $MaxPool(\bullet)$ represent an average pooling operation and a max pooling operation, respectively, and $Conv(\bullet)$ represents a 2D convolution operation.

W-MSA

The W-MSA is a network unit commonly applied in deep learning networks, with a brief introduction provided herein. The W-MSA directly obtains the input for each single-head attention head by evenly slicing the input feature map. After each single-head attention head is processed, Concat aggregation operation is performed.

Channel Hybrid Attention Module

The channel hybrid attention module is labeled as channel hybrid attention layer in FIG. 2, with a module structure including a LayerNorm3, a CAB, a W-MSA2, a LayerNorm4, and a ResFFN2. An input feature map of the HAB is transmitted to the LayerNorm3, and an output of the LayerNorm3 is connected to an input of the CAB and an input of the W-MSA2, respectively. An output of the CAB and an output of the W-MSA2 are added to the input feature map of the HAB, to form an intermediate feature map. An intermediate feature, after being sequentially processed by the LayerNorm4 and the ResFFN2, is added to the intermediate feature map, to obtain a channel attention feature map, which serves as an output of the channel hybrid attention module.

A processing procedure for extracting the hybrid attention feature map of the nighttime image frame by the channel hybrid attention layer is expressed as:

$$F = LN_3(F_{SHA});$$

$$F_Q = \lambda_2 CAB(F_P) + W\text{-}MSA_2(F_P) + F_{SHA};$$

$$F_{CHA} = ResFFN_2(LN_4(F_Q)) + F_Q;$$

where $F_{SHA}$ represents a spatial attention feature map inputted into the channel hybrid attention module, $LN_3(\bullet)$ represents an operator of the LayerNorm3, $F_P$ represents an output of the LayerNorm3; $CAB(\bullet)$ and $W\text{-}MSA_2(\bullet)$ represent an operator of the CAB and an operator of the W-MSA2, respectively; $\lambda_2$ represents a channel attention weight, and $\lambda_2 = 0.02$ can be taken in actual applications; $F_Q$ represents an intermediate feature map obtained by adding an output of the operator of the CAB and an output of the W-MSA$_2$ to the input feature map; and $LN_4(\bullet)$ and $ResFFN_2(\bullet)$ represent an operator of the LayerNorm4 and an operator of the ResFFN2, respectively, and $F_{CHA}$ represents a hybrid attention feature map outputted by the channel hybrid attention module. The ResFFN2 is also a residual feedforward network, which has been described previously.

CAB

Figure 4:
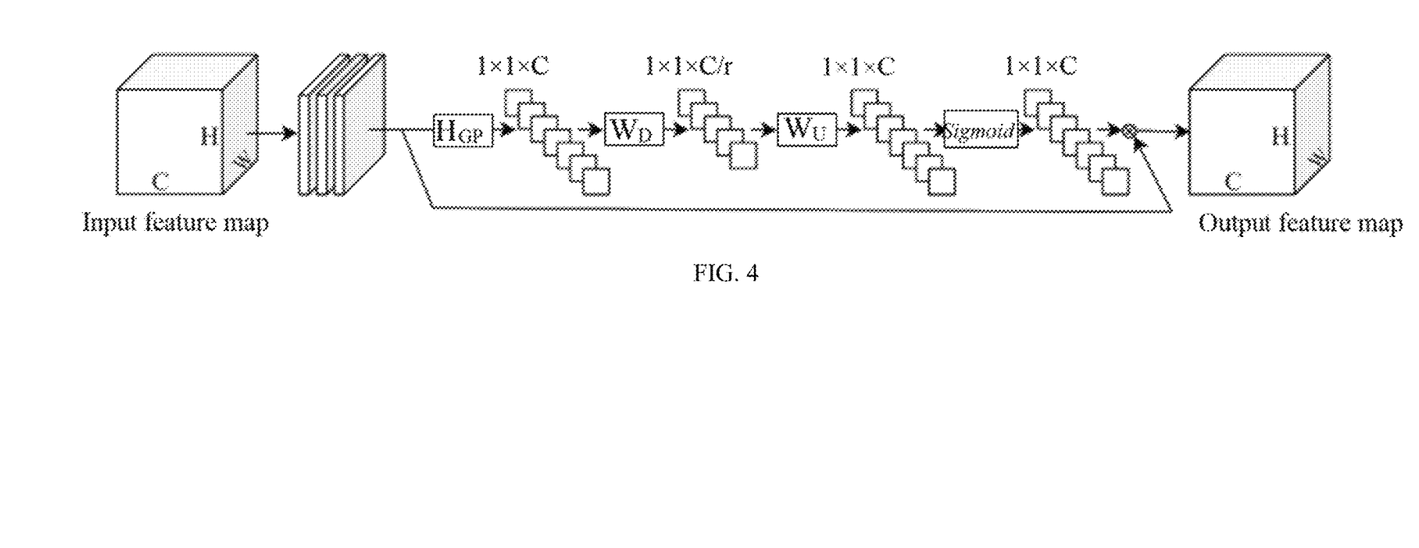
FIG. 4 is a processing flow diagram of CAB in the night vision image enhancement model.

In the channel attention hybrid module, the CAB includes a set of Conv-GELU-Conv layers and a channel attention layer, as shown in FIG. 4. The Conv-GELU-Conv layers are configured to perform a convolution operation of channel compression and a GELU activation function operation on an input feature map, followed by a convolution operation of channel restoration, and the input feature map after those operations is inputted into the channel attention layer. For example, for an input feature with C channels, the number of channels of the output feature after undergoing the first convolutional layer is compressed to C/β, and is adjusted to C after undergoing the second convolutional layer, and then the input feature is sent to the channel attention layer. In the channel attention layer, the input feature map is subjected to adaptive average pooling, followed by channel compression and a ReLU activation function operation, and subsequently, channel restoration processing and a sigmoid function operation are applied, and a result is then multiplied by the feature map inputted into the channel attention layer, to obtain the output result. For instance, if the input feature map is a vector of 1×1×C, $W_D$ and $W_U$ represent operations that compress the number of channels to C/r and restore the number of channels to C, respectively, followed by activation operations.

A processing procedure of the CAB is expressed as:

$$F_B = Conv_U(GELU[Conv_D(F_P)]);$$

$$CAB(F_P) = H_{GP}(F_B) \cdot sigmoid[W_U(\delta(W_D(F_B)))] \times F_B;$$

where $F_P$ and $CAB(F_P)$ represent an input and an output of the CAB, respectively, $GELU(\bullet)$ represents a GELU activation function operation, $Conv_D(\bullet)$ and $Conv_U(\bullet)$ represent a convolution operation of channel compression and a convolution operation of channel restoration, respectively, $F_B$ represents a feature map inputted to the channel attention layer after the convolution operation of channel restoration; $H_{GP}(\bullet)$ represents adaptive average pooling, $sigmoid(\bullet)$ and $\delta(\bullet)$ represent a sigmoid activation function and a ReLU activation function operation, respectively, and $W_D(\bullet)$ and $W_U(\bullet)$ represent channel compression processing and channel restoration processing, respectively.

Decoder Module

The decoder module includes four convolutional layers and four upsampling layers connected in series, labeled as Layers 5 to 8 in FIG. 2. This module is configured to perform four rounds of convolutional processing and upsampling deconvolution processing on the input hybrid attention feature map sequentially, followed by a hyperbolic tangent conversion. Specifically, a 2D convolution followed by a hyperbolic tangent activation function is performed, labeled as Layer 9 in FIG. 2, obtaining a curve estimation parameter map.

A processing procedure of the decoder module is expressed as:

$$F_{de1} = Up(Conv(F_{CHA})_{de1})_{de1};$$

$$F_{de2} = Up(Conv(F_{de1})_{de2})_{de2};$$

$$F_{de3} = Up(Conv(F_{de2})_{de3})_{de3};$$

$$F_{de4} = Up(Conv(F_{de3})_{de4})_{de4};$$

$$F_{de} = tanh(Conv(F_{de4})_{de});$$

where $F_{CHA}$ represents a hybrid attention feature map inputted into the decoder module, $Conv(\bullet)_{dei}$ represents an operator of an ith convolutional layer in the decoder module, $Up(\bullet)_{dei}$ represents an operator of an ith upsampling deconvolution layer in the decoder module, i=1,2,3,4, $F_{de1}$, $F_{de2}$, $F_{de3}$, and $F_{de4}$ represent intermediate operational outputs in the decoder module, $Conv(\bullet)_{de}$ represents a convolutional operator during conversion processing in the decoder module, $tanh(\bullet)$ represents a hyperbolic tangent function tanh operation, and $F_{de}$ represents a curve estimation parameter map outputted by the encoder module.

Curve Projection Module

The curve projection module is configured to perform pixel-by-pixel multiplication using the curve estimation parameter map and the original nighttime image frame, and a result is mapped to the nighttime image frame in a curve projection manner, forming an intermediate feature image.

A processing procedure of the curve projection module is expressed as:

$$X' = X + F_{de} \odot (1-X);$$

where $F_{de}$ represents a curve estimation parameter map outputted by the decoder module, X represents a nighttime image frame, $\odot$ represents a curve projection operator of element-by-element multiplication, and X' represents an output intermediate feature image.

Denoising Processing Module (Denoise)

The Denoise leverages residual learning to accelerate the training process and enhance denoising performance. The structure of Denoise shown in FIG. 5 includes 19 convolutional activation units connected in series and a hyperbolic tangent branch unit. Each convolutional activation unit includes a 2D convolutional layer and a ReLU activation function layer.

Figure 5:
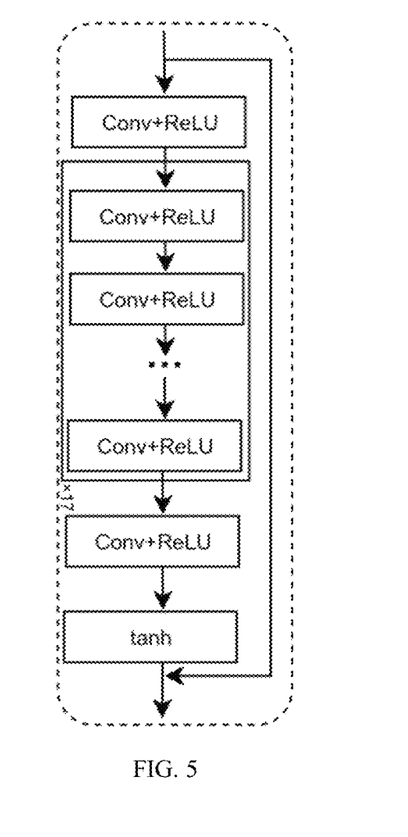
FIG. 5 is a schematic diagram of the architecture of Denoise, which is a denoising processing module in the method of the disclosure.

A processing procedure of the denoising processing module is expressed as:

$$X_{out}=X'+\tanh(W(X')_{19});$$

where X' represents an intermediate feature image inputted into the denoising processing module, $X_{out}$ represents an enhanced nighttime image frame after denoising processing by the denoising processing module, $W(\cdot)_{19}$ represents 19 sets of 2D convolution operations and ReLU activation function operations connected in series, and $\tanh(\cdot)$ represents a hyperbolic tangent function tanh operation. In specific implementations, the 2D convolution operation in the convolution activation unit can take kernel_size=3, padding=1.

Image Object Tracking Task

After the night vision image enhancement model enhances the nighttime image frames in the night vision video sequence, the object tracking algorithm currently employed by UAV for image object tracking tasks can be utilized to perform tracking and recognition of nighttime image objects, obtaining the object tracking and recognition results. During nighttime aerial photography with a UAV, any object can be designated for continuous tracking, and a bounding box can be used to mark the identified tracking object.

A procedure of the image object tracking task can be expressed as:

$$B=\phi(Z;SCTHAB(X))$$

where B represents the predicted tracking object boundary tracked and recognized by the UAV, $\phi(\cdot)$ represents the object tracking algorithm employed by the UAV, Z and X represent an object to be tracked and a search region in subsequent frames, respectively, and $SCTHAB(\cdot)$ represents the enhancement process applied by the SCTHAB-Net, a night vision image enhancement model.

From the above introduction, it is evident that in the nighttime UAV object tracking method fusing a hybrid attention mechanism proposed in the disclosure, the night vision image enhancement model is employed to enhance various nighttime image frames in the night vision video sequence of the UAV, followed by performing image object tracking and recognition, to improve the accuracy of object tracking in nighttime images. Specifically, the enhancement processing on night image frames in the night vision video sequence by the night vision image enhancement model is regarded as a curve projection task, and the red, green, and blue channel values are adjusted to improve image quality. With the aid of the spatial channel hybrid attention mechanism, the model can adaptively learn spatial channel features, enhancing generalization ability, and allowing the network model to focus on more effective features. Additionally, the denoising processing module is introduced to remove noise hidden in nighttime images, thereby improving the object positioning accuracy and tracking performance of UAV in nighttime scenarios, and reducing the failure probability of object tracking in nighttime scenarios.

Next, the training of the night vision image enhancement model in the disclosure is described.

Training of Night Vision Image Enhancement Model

Specifically, the night vision image enhancement model can be trained as follows.

Pre-completed night vision image and daytime images are taken as paired training samples, to constitute a training sample set, which serves as an input of the night vision image enhancement model. A training loss is calculated according to the obtained enhanced night vision image and the corresponding daytime image of the training sample. Parameters of the night vision image enhancement model are optimized according to the training loss until the night vision image enhancement model converges, thereby obtaining a trained night vision image enhancement model.

During the training of the night vision image enhancement model, the training loss is calculated using the following formula:

$$loss = \sum_{j=3}^{5} \frac{\|\phi_j(X_{out}) - \phi_j(Y)\|_2}{c_j w_j h_j}$$

where $\phi_i(\cdot)$ represents an operation of extracting features from an $i_{th}$ layer of an AlexNet network, $X_{out}$ represents an enhanced nighttime image frame obtained after the nighttime image frame in the paired training sample is enhanced by the night vision image enhancement model, Y represents a daytime image frame in the paired training sample, $c_j$ represents the number of channels in a feature map extracted from a $j_{th}$ layer of the AlexNet network, $w_j$ represents a width of the feature map extracted from the $j_{th}$ layer of the AlexNet network, $h_j$ represents a height of the feature map extracted from the $j_{th}$ layer of the AlexNet network, and $\|\cdot\|_2$ represents an L2 norm operation.

In the disclosure, the training loss is calculated though the above formula, which is evaluated by comparing the differences between the feature maps extracted from the 3rd to 5th layers of the AlexNet network for the night image frames enhanced by the model and the daytime image frames in the paired training samples. This can effectively ensure the training gradient and avoid overly complex training flow and comparison operation flow, thereby favoring better robustness and efficiency in model training.

Solutions of the disclosure are described further in detail by reference to the example below.

EXAMPLE

Figure 6:
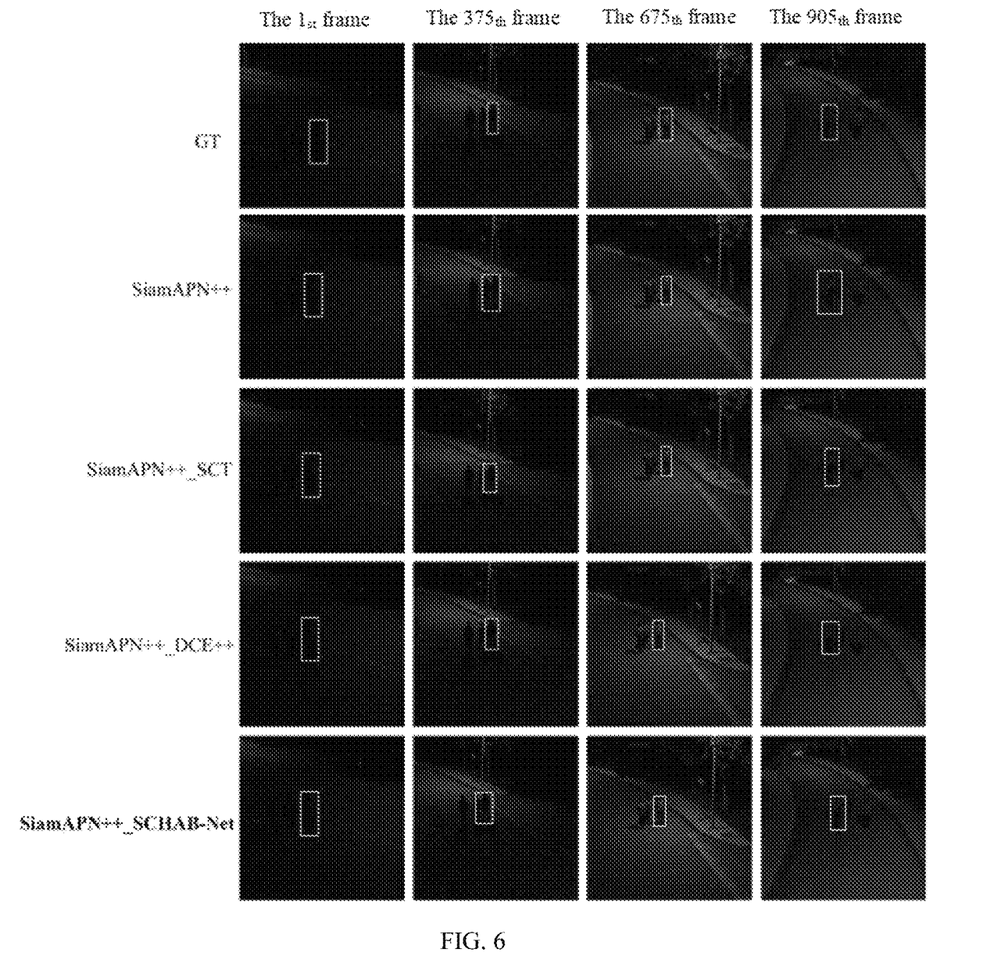
FIG. 6 shows the comparison of the object tracking results obtained using different UAV object tracking algorithms in an example.

In this example, an SCHAB-Net night vision image enhancement model is trained using 485 normal/low-light image pairs from an LOL dataset, and with the public test UAVDark135 as the evaluation benchmark, the performance of the algorithm is assessed through Success and Precision. In this example, the night vision image enhancement model SCTHAB-Net in the disclosure is combined with the SiamAPN++ and SiamRPN UAV tracking algorithms, with the comparison results of algorithms shown in Table 1. SiamAPN++ is selected as a UAV nighttime tracker, and in terms of object tracking and recognition, the night vision image enhancement model SCTHAB-Net of the disclosure is compared with the SCT algorithm and DCE++ night enhancement algorithm in prior art, with the object tracking and recognition results shown in Table 2, and the UAV object tracking results shown in FIG. 6. In FIG. 6, the GT group represents the true object tracking results used as a reference benchmark.

TABLE 1

| Algorithm | Success rate | Accuracy |
|---|---|---|
| SiamRPN++ | 0.374 | 0.472 |
| SiamRPN++_SCHAB-Net (the disclosure) | 0.386 | 0493 |
| HiFT | 0.355 | 0.459 |
| HiFT_SCHAB-Net (the disclosure) | 0.411 | 0.531 |

TABLE 2

| Algorithm | Success rate | Accuracy |
|---|---|---|
| SiamAPN++ | 0.331 | 0.428 |
| SiamAPN++_DCE++ | 0.439 | 0.563 |
| SiamAPN++_SCT | 0.375 | 0.510 |
| SiamAPN++_SCHAB-Net (the disclosure) | 0.462 | 0.609 |

The above experimental results show that, in this example, the nighttime UAV object tracking method of the disclosure employing the night vision image enhancement model shows better object positioning accuracy and tracking performance, and the failure probability of object tracking is significantly reduced.

Finally, it is to be noted that: the example described above is merely used to illustrate rather than limiting the technical solutions of the disclosure. It is to be understood by those ordinary skilled in the art that: modifications or equivalent replacements made to the technical solutions of the disclosure without departing from the principle and scope of the technical solutions of the disclosure are included in the scope of claims of the disclosure.

The invention claimed is:

1. A nighttime unmanned aerial vehicle (UAV) object tracking method fusing a hybrid attention mechanism, comprising: acquiring a night vision video sequence from a UAV, inputting a nighttime image frame of the night vision video sequence into a pre-trained night vision image enhancement model, to obtain a corresponding enhanced nighttime image frame, and performing image object tracking and recognition on the enhanced nighttime image frame, to obtain an object tracking and recognition result;
the night vision image enhancement model comprising an encoder module, a spatial hybrid attention module, a channel hybrid attention module, a decoder module, a curve projection module, and a denoising processing module;
the encoder module being configured to extract an initial convolutional feature map of the nighttime image frame;
the spatial hybrid attention module being configured to enhance the attention of a feature space dimension of the initial convolutional feature map, to form a spatial attention feature map of the nighttime image frame;
the channel hybrid attention module being configured to enhance the attention of a feature channel dimension of the spatial attention feature map, to form a hybrid attention feature map of the nighttime image frame;
the decoder module being configured to convert the hybrid attention feature map into a curve estimation parameter map;
the curve projection module being configured to map the curve estimation parameter map onto the nighttime image frame in a curve projection manner, to form an intermediate feature image of the nighttime image frame; and
the denoising processing module being configured to perform denoising processing on the intermediate feature image, to obtain the corresponding enhanced nighttime image frame;
the decoder module comprising four convolutional layers and four upsampling layers connected in series, for performing convolutional processing and upsampling deconvolution processing on the inputted hybrid attention feature map in sequence, followed by hyperbolic tangent conversion processing, to obtain the curve estimation parameter map; a processing procedure of the decoder module being expressed as:

$F_{de1}=\text{Up}(\text{Conv}(F_{CHA})_{de1})_{de1};$ $F_{de2}=\text{Up}(\text{Conv}(F_{de1})_{de2})_{de2};$ $F_{de3}=\text{Up}(\text{Conv}(F_{de2})_{de3})_{de3};$ $F_{de4}=\text{Up}(\text{Conv}(F_{de3})_{de4})_{de4};$ $F_{de}=\tanh(\text{Conv}(F_{de4})_{de});$ where $F_{CHA}$ represents a hybrid attention feature map inputted into the decoder module, $\text{Conv}(\bullet)_{dei}$ represents an operator of an $i_{th}$ convolutional layer in the decoder module, $\text{Up}(\bullet)_{dei}$ represents an operator of an $i_{th}$ upsampling deconvolution layer in the decoder module, i=1, 2,3,4, $F_{de1}$, $F_{de2}$, $F_{de3}$, and $F_{de4}$ represent intermediate operational outputs in the decoder module, $\text{Conv}(\bullet)_{de}$ represents a convolutional operator during conversion processing in the decoder module, $\tanh(\bullet)$ represents a hyperbolic tangent function tanh operation, and $F_{de}$ represents a curve estimation parameter map outputted by the encoder module.

2. The nighttime UAV object tracking method fusing a hybrid attention mechanism according to claim 1, wherein the encoder module comprises four convolutional layers and four downsampling layers connected in series, for performing convolutional processing and pooling processing on the inputted nighttime image frame in sequence, to obtain the initial convolutional feature map of the nighttime image frame after convolutional processing;
a processing procedure for extracting the initial convolutional feature map of the nighttime image frame by the encoder module being expressed as:

$F_{en1}=\text{Pool}(\text{Conv}(X)_{en1})_{en1};$ $F_{en2}=\text{Pool}(\text{Conv}(F_{en1})_{en2})_{en2};$ $F_{en3}=\text{Pool}(\text{Conv}(F_{en2})_{en3})_{en3};$ $F_{en}=\text{Pool}(\text{Conv}(F_{en3})_{en4})_{en4};$ where X represents an inputted original nighttime image frame, $\text{Conv}(\bullet)_{eni}$ represents an operator of an $i_{th}$ convolutional layer in the encoder module, $\text{Pool}(\bullet)_{eni}$ represents an operator of an $i_{th}$ downsampling layer in the encoder module, i=1,2,3,4, $F_{en1}$, $F_{en2}$, and $F_{en3}$ represent intermediate operational outputs in the encoder module, and $F_{en}$ represents an initial convolutional feature map outputted by the encoder module.

3. The nighttime UAV object tracking method fusing a hybrid attention mechanism according to claim 1, wherein the spatial hybrid attention module comprises a first normalization layer (LayerNorm1), a spatial attention module unit (SAM), a first window multi-head self-attention unit (W-MSA1), a second normalization layer (LayerNorm2), and a first residual feedforward network layer (ResFFN1);

an input feature map of the spatial hybrid attention module is transmitted to the LayerNorm1, and an output of the LayerNorm1 is connected to an input of the SAM and an input of the W-MSA1, respectively; an output of the SAM and an output of the W-MSA1 are added to an input feature of the spatial hybrid attention module, to form an intermediate feature map; and then an intermediate feature, after being sequentially processed by the LayerNorm2 and the ResFFN1, is added to the intermediate feature map, to obtain the spatial attention feature map, which serves as an output of the spatial hybrid attention module;

a processing procedure for extracting the spatial attention feature map of the nighttime image frame by the spatial hybrid attention module being expressed as:

$F_N = LN_1(F_{en})$;

$F_M = \lambda_1 SAM(F_N) + W\text{-}MSA_1(F_N) + F_{en}$;

$F_{SHA} = ResFFN_1(LN_2(F_M)) + F_M$;

where $F_{en}$ represents an initial convolutional feature map inputted into the spatial hybrid attention module, $LN_1(\cdot)$ represents an operator of the LayerNorm1, and $F_N$ represents an output of the LayerNorm1; $SAM(\cdot)$ and $W\text{-}MSA_1(\cdot)$ represent an operator of the SAM and an operator of the W-MSA1, respectively, $\lambda_1$ represents a spatial attention weight, $F_M$ represents an intermediate feature map obtained by adding an output of the operator of the SAM and an output of the W-MSA1 to an input feature map; and $LN_2(\cdot)$ and $ResFFN_1(\cdot)$ represent an operator of the LayerNorm2 and an operator of the ResFFN1, respectively, and $F_{SHA}$ represents a spatial attention feature map outputted by the spatial hybrid attention module.

4. The nighttime UAV object tracking method fusing a hybrid attention mechanism according to claim 3, wherein the SAM is configured to perform a convolution operation of channel compression and a Gaussian error linear unit (GELU) activation function operation on an input feature map $F_N$, followed by a convolution operation of channel restoration, and then the input feature map $F_N$ after those operations is inputted into a spatial attention layer; and in the spatial attention layer, the input feature map $F_N$ is subjected to max pooling and average pooling processing, respectively, followed by a Concat operation to aggregate vectors, and finally a two-dimensional (2D) convolution operation and a sigmoid activation function operation are performed to obtain a result, which is then multiplied by the input feature map $F_N$, to obtain an output result; a processing procedure of the SAM being expressed as:

$F_O = Conv_U(GELU[Conv_D(F_N)])$;

$SAM(F_N) = sigmoid(Conv([AvgPool(F_O); MaxPool(F_O)])) \times F_O$;

where $F_N$ and $SAM(F_N)$ represent an input and an output of the SAM, respectively, $GELU(\cdot)$ represents a GELU activation function operation, $ConV_D(\cdot)$ and $Conv_U(\cdot)$ represent a convolution operation of channel compression and a convolution operation of channel restoration, respectively, and $F_O$ represents a feature map inputted into the spatial attention layer after the convolution operation of channel restoration; and $AvgPool(\cdot)$ and $MaxPool(\cdot)$ represent an average pooling operation and a max pooling operation, respectively, and $Conv(\cdot)$ represents a 2D convolution operation.

5. The nighttime UAV object tracking method fusing a hybrid attention mechanism according to claim 1, wherein the channel hybrid attention module comprises a third normalization layer (LayerNorm3), a channel attention block unit (CAB), a second window multi-head self-attention unit (W-MSA2), a fourth normalization layer (LayerNorm4), and a second residual feedforward network layer (ResFFN2); an input feature map of a hybrid attention block (HAB) is transmitted to the LayerNorm3, and an output of the LayerNorm3 is connected to an input of the CAB and an input of the W-MSA2, respectively; an output of the CAB and an output of the W-MSA2 are added to an input feature of the channel hybrid attention module, to form an intermediate feature map; and an intermediate feature, after being sequentially processed by the LayerNorm4 and the ResFFN2, is added to the intermediate feature map, to obtain a channel attention feature map, which serves as an output of the channel hybrid attention module;

a processing procedure for extracting the hybrid attention feature map of the nighttime image frame by the channel hybrid attention module being expressed as:

$F_P = LN_3(F_{SHA})$;

$F_Q = \lambda_2 CAB(F_P) + W\text{-}MSA_2(F_P) + F_{SHA}$ $F_{CHA} = ResFFN_2(LN_4(F_Q)) + F_Q$;

where $F_{SHA}$ represents a spatial attention feature map inputted into the channel hybrid attention module, $LN_3(\cdot)$ represents an operator of the LayerNorm3, and $F_P$ represents an output of the LayerNorm3; $CAB(\cdot)$ and $W\text{-}MSA_2(\cdot)$ represent an operator of the CAB and an operator of the W-MSA2, respectively, $\lambda_2$ represents a channel attention weight, and $F_Q$ represents an intermediate feature map obtained by adding an output of the operator of the CAB and an output of the W-MSA2 to the input feature map; $LN_4(\cdot)$ and $ResFFN_2(\cdot)$ represent an operator of the LayerNorm4 and an operator of the ResFFN2, respectively, and $F_{CHA}$ represents a hybrid attention feature map outputted by the channel hybrid attention module.

6. The nighttime UAV object tracking method fusing a hybrid attention mechanism according to claim 5, wherein the CAB is configured to perform a convolution operation of channel compression and a GELU activation function operation on the input feature map, followed by a convolution operation of channel restoration, and then the input feature map after those operations is inputted into the channel attention layer; and in the channel attention layer, the input feature map is subjected to adaptive average pooling, followed by channel compression processing and rectified linear unit (ReLU) activation function operation, and then channel restoration processing and sigmoid function operation are performed to obtain a result, which is then multiplied by the feature map inputted into the channel attention layer, to obtain an output result; a processing procedure of the CAB being expressed as:

$F_B = Conv_U(GELU[Conv_D(F_P)])$;

$CAB(F_P) = H_{GP}(F_B) \cdot sigmoid[W_U(\delta(W_D(F_B)))] \times F_B$;

where $F_P$ and $CAB(F_P)$ represent an input and an output of the CAB, respectively, $GELU(\cdot)$ represents a GELU activation function operation, $ConV_D(\cdot)$ and $Conv_U(\cdot)$ represent a convolution operation of channel compression and a convolution operation of channel restoration, respectively, $F_B$ represents a feature map inputted into the channel attention layer after the convolution operation of channel restoration; and $H_{GP}(\cdot)$ represents adaptive average pooling, $sigmoid(\cdot)$ and $\delta(\cdot)$ represent a sigmoid activation function and a ReLU activation function operation, respectively, and $W_D(\bullet)$ and $W_U(\bullet)$ represent channel compression processing and channel restoration processing, respectively.

7. The nighttime UAV object tracking method fusing a hybrid attention mechanism according to claim 1, wherein the curve projection module is configured to perform pixel-by-pixel multiplication using the curve estimation parameter map and the original nighttime image frame, and a result is mapped to the nighttime image frame in a curve projection manner, forming the intermediate feature image;
a processing procedure of the curve projection module being expressed as:

$$X' = X + F_{de} \odot (1-X);$$

where $F_{de}$ represents a curve estimation parameter map outputted by the decoder module, X represents a nighttime image frame, $\odot$ represents a curve projection operator of element-by-element multiplication, and X' represents an output intermediate feature image.

8. The nighttime UAV object tracking method fusing a hybrid attention mechanism according to claim 1, wherein the denoising processing module comprises 19 convolutional activation units connected in series and a hyperbolic tangent branch unit, with each convolutional activation unit comprising a 2D convolutional layer and a ReLU activation function layer; a processing procedure of the denoising processing module being expressed as:

$$X_{out} = X' + \tanh(W(X')_{19});$$

where X' represents an intermediate feature image inputted into the denoising processing module, $X_{out}$ represents an enhanced nighttime image frame after denoising processing by the denoising processing module, $W(\bullet)_{19}$ represents 19 sets of 2D convolution operations and ReLU activation function operations connected in series, and $\tanh(\bullet)$ represents a hyperbolic tangent function tanh operation.

9. The nighttime UAV object tracking method fusing a hybrid attention mechanism according to claim 1, wherein the night vision image enhancement model is trained as follows:
taking pre-completed night vision images and daytime images as paired training samples, to constitute a training sample set, which serves as an input of the night vision image enhancement model, calculating a training loss according to the obtained enhanced night vision images and the corresponding daytime images of the training sample, and optimizing parameters of the night vision image enhancement model according to the training loss until the night vision image enhancement model converges, obtaining a trained night vision image enhancement model;
during the training of the night vision image enhancement model, the training loss is calculated using the following formula:

$$\text{loss} = \sum_{j=3}^{5} \frac{\|\phi_j(X_{out}) - \phi_j(Y)\|_2}{c_j w_j h_j};$$

where $\phi_i(\bullet)$ represents an operation of extracting features from an $i_{th}$ layer of an AlexNet network, $X_{out}$ represents an enhanced nighttime image frame obtained after the nighttime image frame in the paired training sample is enhanced by the night vision image enhancement model, Y represents a daytime image frame in the paired training sample, $c_j$ represents the number of channels of a feature map extracted from a $j_{th}$ layer of the AlexNet network, $w_j$ represents a width of the feature map extracted from the $j_{th}$ layer of the AlexNet network, $h_j$ represents a height of the feature map extracted from the $j_{th}$ layer of the AlexNet network, and $\|\bullet\|_2$ represents an L2 norm operation.

* * * * *